(No Model.)
L. S. FLATAU.
HARROW AND CULTIVATOR.
No. 471,378. Patented Mar. 22, 1892.
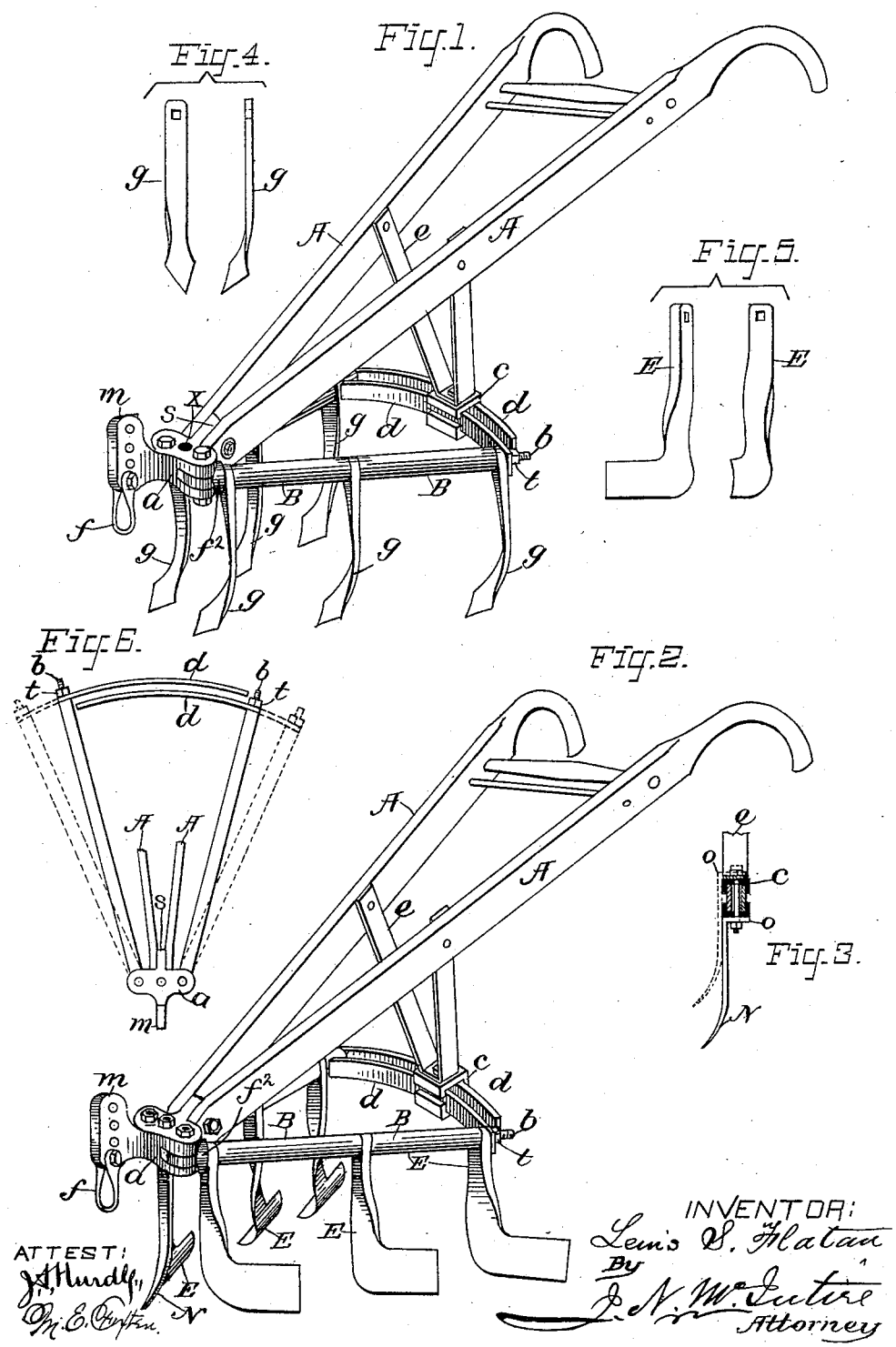

UNITED STATES PATENT OFFICE.

LOUIS S. FLATAU, OF PITTSBURG, TEXAS, ASSIGNOR TO B. F. AVERY & SONS, OF LOUISVILLE, KENTUCKY.

HARROW AND CULTIVATOR.

SPECIFICATION forming part of Letters Patent No. 471,378, dated March 22, 1892.

Application filed July 27, 1891. Serial No. 400,836. (No model.)

*To all whom it may concern:*

Be it known that I, LOUIS S. FLATAU, of Pittsburg, in the county of Camp and State of Texas, have invented certain new and useful Improvements in Harrows and Cultivators; and I do hereby declare that the following is a full, clear, and exact description of the same, reference being had to the accompanying drawings, forming part of this specification.

My invention relates to that type of harrow and cultivator which comprises a sort of triangular-shaped horizontal frame, the apex of which constitutes the leading or draft end of the machine and in which the said frame carries a series of depending teeth, blades, or other cultivating devices that have their upper ends or portions detachably secured to the said frame. I propose to provide for use a machine of this type which shall possess, in an eminent degree, the combined qualities of simplicity and economy of manufacture, great strength and durability, and the capacity to perform a variety of harrowing and cultivating operations in the most satisfactory and easy manner.

To these main ends and objects my invention consists in certain novel devices and combinations of devices in my improved machine, that will be found hereinafter fully described, and that will be most particularly pointed out and defined in the claims of this specification.

To enable those skilled in the art to fully understand and practice my invention, I will now proceed to describe the construction and operation of a harrow and cultivator embodying all the novel structural features and devices invented by me and made the subject of this application, referring by letters of reference to the accompanying drawings, which form part of this specification, and in which I have shown my invention carried into effect in a machine precisely such as I have so far used, though in practicing my invention various modifications may of course be made and less than all the separate parts or features of my improved machine may be used at once with more or less advantage.

In the drawings, Figure 1 is a perspective view of one of my improved machines, showing the implement in a condition adapted for use as a simple harrow. Fig. 2 is a similar view, but with a different set of cultivating devices applied to the main frame and with a certain device added for a purpose to be presently explained. Fig. 3 is a detail vertical section showing in full and dotted lines two different attachments of a central and rudder-like tooth to the rear middle portion of the frame. Fig. 4 shows detached one of the side teeth seen at Fig. 1. Fig. 5 shows detached one of the side teeth seen attached to the main frame at Fig. 2, and Fig. 6 is a detail view showing in plan view only the triangular frame of the machine and illustrating by dotted lines how the rear ends of the obliquely-arranged arms of the frame are adjusted toward and from each other.

In the several figures the same part when visible will be found designated by the same reference-letter.

The triangularly-shaped frame of the machine is composed, essentially, of two metallic bars $b\ b$, which are preferably of steel and about five-eighths of an inch square in cross-section and that are jointed by vertical pivots at their forward ends to a metallic part $a$, which I call the "draw-head," and two curved metallic bars $d\ d$, which I designate "spreader-bars," to one end of each of which the rear end of one of the bars or arms $b\ b$ is secured in a manner to be presently explained.

The draw-head $a$ is formed or provided with a forwardly-projecting centrally-arranged vertical perforated plate $m$ for the convenient attachment of an ordinary clevis $f$, to which the team used to draw the machine along over the ground may be hitched, and said part $a$ is also formed or provided with a rearwardly-projecting centrally-arranged ear $s$, to which the lower ends of the handles A are fastened, as clearly shown, preferably by a single bolt, while from the handles A A depend the legs of a sort of V-shaped metallic brace $e$, the upper ends of which are securely fastened, respectively, to said handles, as shown, and the lower loop-like portion of which is perforated for the passage through its said perforation of a bolt, by which it is fastened to a clamp $c$. This clamp comprises simply two plate-like jaws, which, as clearly shown, engage with the opposite (or upper and lower) edges of the curved spreader-bars $d\,d$, between which jaws said bars are securely clamped by the action of the same bolt that serves to couple the lower end of the brace $e$ to the clamping-jaws and a nut on the lower end of said bolt that bears against the lower surface of the lower one of the clamping-jaws. This bolt is preferably made considerably longer than would be necessary, to enable it to perform the office so far ascribed to it, in order that it may also perform the function of securing in place the supplemental tooth or rudder-like device N, as will be presently explained.

$g$ are a series of harrow-teeth, (in the case shown six,) which, as seen at Fig. 1, are secured (three on one and three on the other) to the two obliquely-arranged arms or bars $b\,b$ of the machine, while E are another set of tooth-like devices or cultivators, which, as illustrated by Fig. 2, may be substituted for the teeth $g$, as occasion (or the kind of work to be done by the machine) may require. These cultivator devices E, I denominate "half-wings" or "wing-teeth," and it will be seen that when in working position, as shown at Fig. 2, these wing-teeth are in effect substantially halves of what are well known as "heel-sweeps," each pair or set (which comprises one on one bar $b$ and another opposite to it on the other bar) performing completely the operation of a complete heel-sweep.

In assembling the parts shown either at Fig. 1 or Fig. 2, the rear ends of the arms or bars $b$ having been detached from the spreader-bars $d$, a washer $f^2$, one side of which is shaped to fit up against or seat itself on the curved surfaces of the draw-head $a$ and the head at the forward end of the arm $b$, is first slipped onto said arm and pushed forward into the position shown at Figs. 1 and 2. Then a tooth of either the kind seen at Fig. 1 or that shown in Fig. 2 is threaded or slipped onto said bar $b$ and pushed home against the washer $f^2$. Then a tubular collar or pipe-like separator B, that is of a length to determine the requisite distance between the teeth, is in like manner slipped onto said arm or bar $b$ until its forward end abuts against the previously assembled tooth. Then another tooth is put on the bar, then another tube E, and finally another tooth, after which the perforated end of one of the spreader-bars $d$ is slipped over the threaded rear end of the bar $b$ and a nut $t$ applied and turned home, whereby the parts are all locked in place. In like manner the corresponding parts at the other side of the machine are assembled, all of the teeth and other devices being perforated at proper places, it will be understood, for the accommodation of the bars $b$ that pass through them.

The draw-head $a$ has a vertical hole through it, as seen at $x$, Fig. 1, for the accommodation of a bolt, by means of which and a nut the supplemental tooth or device N may be secured to said draw-head as follows: The tooth N, which I designate the "duck-bill" tooth, unlike all the other attachable and detachable cultivating devices shown, has its upper end turned over or bent at right angles to the body and vertical portion of the tooth, and this bent-over or horizontal part $o$ of said tooth N is perforated, so that when this perforated portion $o$ shall have been placed beneath and in contact with the lower surface of the draw-head $a$ and with this perforation in line with the hole in the part $a$ a short screw-bolt may be passed through the holes of the two devices, and by the application of a nut to the threaded end of the bolt the said duck-bill tooth and the said draw-head will be securely fastened together, with the said tooth depending vertically from the said draw-bar, all in such manner that in drawing the implement along over the ground the tooth N will burst out the soil at a line of travel coincident with that over which the center of the cultivator and harrow passes and where the other teeth or devices will not operate on the ground being treated. The most important functions of this device N are, however, performed when it is secured in place at the rear of the machine, for when there placed in position it serves also as a rudder, causing the implement to run very steady and evenly.

By reference more especially to Fig. 3 it will be seen that to use the duck-bill tooth and rudder N at the rear of the machine said device has its bent-over top portion $o$ bolted securely to the clamp $c$ by the same bolt that unites the bolts or jaws of the clamp, and that by arranging it with the part $o$ on top of the clamp, as seen in dotted lines, it will depend to a given extent, while by placing the part $o$ beneath the clamp, as shown in full lines, it will have its point considerably lowered. (In practice, as I have so far made machines, about two inches.)

The preferable shape of the clamping-jaws and the precise relative arrangement of these parts and the spreader-bars $d\,d$ that I have thus far adopted in practice will be readily understood from the drawings, (see Figs. 1, 3, and 6;) but in carrying my invention into effect many of the details may of course be varied in form and proportions without in the least materially changing the principle of construction or mode of operation of the machine.

The curved spreader-bars $d$, it will be seen, are arranged so that when the rear ends of the arms or bars $b\,b$ are set as near together as possible that bar $b$ which is secured to one end of the inner one of the two spreader-bars can have its nut $t$ removed and replaced without interference with the adjacent end of the outer spreader-bar, and the arrangement of parts is such, as shown, that whether the rudder-like device N be applied to the rear of the machine or not by simply loosening the nut on the bolt of clamp $c$ the spreader-bars $d$ can be relatively adjusted endwise to vary the spread of the toothed arms $b$, and then by simply tightening up said nut all the parts will be rigidly locked in the desired relative positions.

Although I have in practice used square bars at $b$ and perforated the upper ends of the teeth $g$ and E with square holes, these bars might be of round bar-steel and the holes in the devices to be secured thereon be round, for with either form of rods and holes in putting the parts together the teeth may be respectively clamped so securely or vise-like between the opposing end surfaces of the collars on the rods $b$ as to prevent any displacement of the teeth. The forms of parts shown are, however, deemed preferable.

In practice I have forged the half-wing or wing-like portions of the devices E on the lower ends or portions of the vertical or stem-like portions of the devices; but some other method of construction may be followed with reference to these devices which *per se* form an important part of my invention. These wing-teeth, arranged and operating as they do in pairs after the fashion of heel-sweeps, render the machine capable when rigged up, as seen at Fig. 2, of straddling a row of growing crop, cleaning the bed, and scraping it down and cutting the grass. It will also perfectly clean out a middle or water furrow.

When the machine is used with the rudder-like tooth N applied (at the rear) to harrow down beds preparatory to planting, the side sets of teeth will level the bed down to its proper shape, while the duck-bill tooth N following along will not only complete the work left unfinished (in the middle of the path of travel of the machine) by the side teeth of the harrow, but will also form and leave a nice furrow for the planter-wheel to follow.

I consider the structural feature or features by which I am enabled to assemble, separate, and reassemble certain parts of the machine to adapt it to different kinds of work as a very important part of my invention, since thereby a machine is produced in which, with exceeding simplicity of construction and great strength and durability, the parts which are detachable are when adjusted for use held most securely in their proper relationships and one which can be easily handled and will do perfect work. Of course these features or parts of my invention which are capable of use separately from others of the novel features may be used alone or in a machine not embracing the rest of my invention with more or less advantage, though I contemplate in practicing my invention that the best results will follow from the use of a machine embodying all my improvements.

Having now so fully explained the construction and operation of my improved machine that those skilled in the art can make and use a harrow and cultivator embodying either in whole or in part all the important features of my invention, what I claim as new, and desire to secure by Letters Patent, is—

1. The combination, with the spreader-bars, the obliquely-arranged teeth-carrying arms, and a metallic device to which said arms are pivoted (at their convergent ends) and which has a bolt-hole in it, of a supplemental detachable duck-bill tooth N, bolted directly to the under side of the said metallic device and depending directly therefrom, all substantially in the manner and for the purposes set forth.

2. In combination with the spreader-bars and a pair of clamping-jaws adapted to hold them in place relatively, as specified, the device N, having a perforated top part, which may be secured to either the upper or lower one of said jaws, and means for securing said device N to either of said jaws at pleasure, for the purposes set forth.

3. The combination, with the handles and main frame of a harrow or cultivator, of the vertically-arranged spreader-bars, the clamping-jaws, and the brace $e$, having its upper end secured to the handles, the whole constructed, arranged, and operating in substantially the manner and for the purposes set forth.

In witness whereof I have hereunto set my hand this 6th day of July, 1891.

LOUIS S. FLATAU.

In presence of—
C. F. HUHLEIN,
STANLEY GOFF.